United States Patent
Olson

(10) Patent No.: US 6,401,902 B1
(45) Date of Patent: Jun. 11, 2002

(54) SYSTEM AND METHOD FOR FEEDING OF RETURNABLE CONTAINERS

(76) Inventor: Roy Olson, Hertigvägen 18, SE-681 32, Kristinehamn (SE)

( * ) Notice: Subject to any disclaimer, the term of this patent is extended or adjusted under 35 U.S.C. 154(b) by 0 days.

(21) Appl. No.: 09/673,839

(22) PCT Filed: Apr. 21, 1999

(86) PCT No.: PCT/SE99/00638

§ 371 (c)(1),
(2), (4) Date: Jan. 5, 2001

(87) PCT Pub. No.: WO99/55606

PCT Pub. Date: Nov. 4, 1999

(30) Foreign Application Priority Data

Apr. 24, 1998 (SE) .............................. 9801483

(51) Int. Cl.$^7$ .............................................. B65G 43/00
(52) U.S. Cl. ................. 198/341.01; 198/736; 198/747; 198/468.8
(58) Field of Search ........................ 198/341.03, 341.01, 198/341.07, 717, 718, 736, 747, 749, 750.7, 468.8, 488.11

(56) References Cited

U.S. PATENT DOCUMENTS

| | | | | |
|---|---|---|---|---|
| 931,536 A | * | 8/1909 | Weiland | 198/747 |
| 2,487,464 A | * | 11/1949 | Mosshart | 414/176 |
| 3,213,783 A | * | 10/1965 | May et al. | 100/906 |
| 3,604,345 A | * | 9/1971 | Boje | 100/48 |
| 3,621,774 A | * | 11/1971 | Dedio et al. | 414/198 |
| 3,633,770 A | * | 1/1972 | Howard | 214/17 B |
| 3,802,335 A | * | 4/1974 | Longo | 100/35 |
| 3,907,373 A | * | 9/1975 | Jensen et al. | 302/14 |
| 3,995,734 A | * | 12/1976 | Berg, Jr. | 198/540 |
| 4,043,471 A | * | 8/1977 | Trumbull et al. | 214/152 |
| 4,047,901 A | * | 9/1977 | Baron et al. | 48/86 R |
| 4,255,161 A | * | 3/1981 | Grimminger et al. | 48/86 R |
| 4,406,220 A | * | 9/1983 | Bergman | 100/49 |
| 5,192,188 A | * | 3/1993 | Kunz et al. | 414/217 |
| 5,374,148 A | * | 12/1994 | Kilpelainen et al. | 414/217 |

FOREIGN PATENT DOCUMENTS

| | | | | |
|---|---|---|---|---|
| FR | 2 736 627 | 1/1997 | | B65G/51/02 |
| WO | WO 9512182 | 5/1994 | | G07F/7/06 |
| WO | WO 94/17497 | 8/1994 | | |

* cited by examiner

Primary Examiner—Christopher P. Ellis
Assistant Examiner—Rashmi Sharma
(74) Attorney, Agent, or Firm—Michael D. Bednarek; Shaw Pittman LLP

(57) ABSTRACT

Collecting system for packagings (18), preferably returnable packagings, comprising a feeding-in device (10) for the packagings, which feeding-in device is arranged at a first location, an automatic transport device being arranged to automatically transport the packagings from said feeding-in device (10), in a transport canal (12), to a demolition and/or collecting device (14, 16) which is arranged at a second location, said second location being situated at some distance from said first location.

16 Claims, 4 Drawing Sheets

SYSTEM AND METHOD FOR FEEDING OF RETURNABLE CONTAINERS

TECHNICAL FIELD

The present invention relates to a collecting system for packagings, preferably returnable packagings and even more preferred aluminium cans for beverages, comprising a feed-in device for the packagings, which feed-in device is arranged at a first location, preferably in a retail shop, suitably in connection with its entrance.

PRIOR ART AND PROBLEM

Conventional systems for collection of returnable packagings, more precisely for aluminium cans for beverages, consist of automatic machines into which cans are fed, are decoded by a bar code reader, are cut to pieces and are collected in plastic sacs. The automatic machines are often located in connection with the entrances of food shops so that the customers not will have to carry empty cans through the shop.

These automatic machines and their location cause a number of disadvantages. One nuisance, being noise, arises in the shop, or at least in its entrance, from the cutting device that cuts the cans to pieces, due to the cutting device being located nearby the automatic machine. This type of noise does, besides being a nuisance to the customers, constitute a burden for the personnel in their work environment, especially for the cashiers who are often located in connection to the entrance. Furthermore, the collecting in plastic sacs gives the disadvantages that the sacs, due to space and handling aspects, not can be very large, usually about 150 liters, which means that the automatic machines relatively often stop due to full sac, leading to the shop personnel having to change sacs and having to transport the filled sac to the loading ramp of the stop, where it is taken care of for further transport. Moreover, the transport from the automatic machine to the loading ramp causes risks for the personnel hurting themselves on the cut up cans and also a risk that possible remaining liquid contents in the can leak from the sac if it gets holes. Such holes arise very easy due to the sharp edges of the cut up cans.

There is known, through GB 1,531,438, a device for the transport of preferably light articles such as empty plastic bottles, in connection with their production and filling with beverages or other liquid. Accordingly, the device also comprises means for distribution of the bottles so that they can be placed on a conveyor belt or similar device for the filling. At the transport to this conveyor belt, the bottles are automatically fed in into an intake and are transported in a tubular shaped transporting system to the outlet for the means for distribution. The bottles are transported one by one in the tubular system by aid of air which is blown in at the intake. A high speed of air, which transports the bottles, arises due to the tube being formed as a venturi after the air blow intake.

SHORT DESCRIPTION OF THE INVENTION

According to the present invention there is provided a collecting system for packagings, preferably returnable packagings, comprising a feed-in device for the packagings, which feed-in device is arranged at a first location. Furthermore, an automatic transport device is arranged to automatically, and preferably mechanically, transport the packagings from said feed-in device to a demolition and/or collecting device which is arranged at a second location, said second location being located at a distance from said first location.

Several advantages in relation to prior art, are obtained by the invention. The nuisance of noise in the entrance of food shops disappears and work load/risks for the personnel decreases significantly, since the packagings are transported automatically to the collecting device. The latter may also comprise a container of considerable size, which does not have to be emptied very often and which can be emptied by machine, to a truck or similar.

According to one aspect of the invention, said second location is situated at least 5 meters, preferably 8–100 meters and even more preferred 10–80 meters from said first location. Long distances are an advantage in eliminating noise in the entrance, but also in the room which is located behind the wall which the feed-in device, i.e. the automatic machine, is arranged in. This room is often used by the personnel as store room, office, coffee room or similar. In existing food shops, there is also a long distance between the entrance with the automatic machines and the loading ramp, which is a suitable location for a collecting device and which is often located at the backside of the shop.

According to another aspect of the invention, the transport device comprises a driving device and a transport canal, whereby the packagings are conducted in this transport canal by the driving device pushing a first packaging a distance forward in the transport canal, whereby this first packaging pushes a second packaging, being ahead of the first one, forward in the transport canal, which second packaging, in its turn, pushes a third packaging, being ahead of the second packaging, forward, and so on.

DESCRIPTION OF THE DRAWINGS

The invention will in the following be described in greater detail with reference to the drawings, of which.

Figure 1:
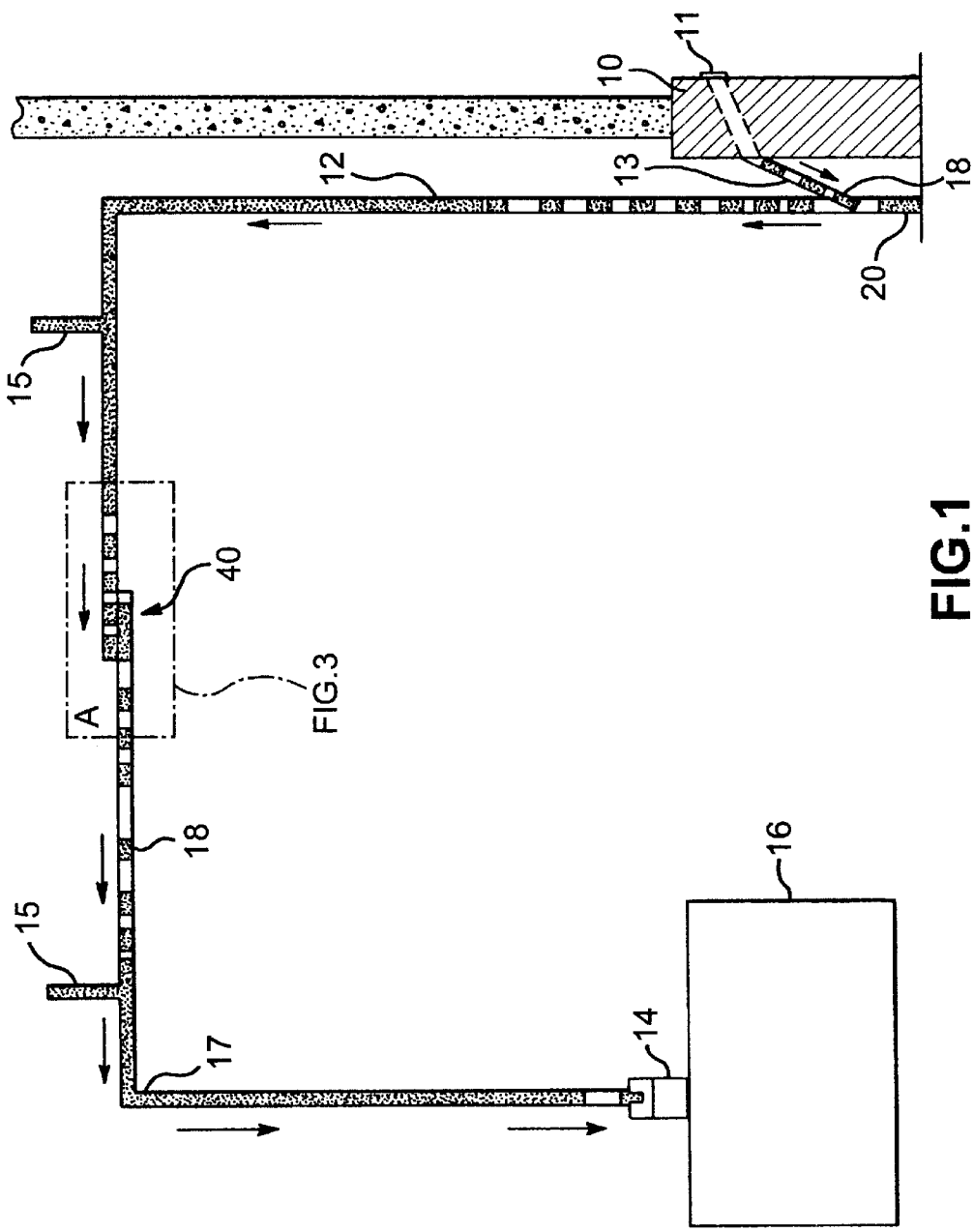
FIG. 1 shows a preferred collecting system according to the invention.

Item 10 in FIG. 1 represents a feeding-in device or automatic machine which is arranged in a wall. On one side of the feeding-in device there is arranged an opening 11 where the customer can enter his packagings, in the following referred to as cans 18. On the other side of the feeding-in device, on the other side of the wall, mouths a branch canal 13, which preferably consists of a tube in e.g. PVC or steel. This branch canal 13 is suitably sloping downwards and connects in a branch point to a transport canal 12, which also preferably consists of a tube in e.g. PVC or steel, with a diameter of 60–200 mm, preferably 60–160 mm and even more preferred about 70–110 mm. Suitably, there may be used at least two different tube dimensions, e.g. 76 mm and 108 mm, in the transport canal, whereby the smaller dimensions is used where an accurate guiding of the cans is required, e.g. in the branch conduit, in the first part of the transport canal, and in connection with possible pressure enhancement devices according to below. In the branch conduit, there is arranged a hatch (not shown) which is controlled by a cylinder, and a blocking device (not shown) in the form of a piston stem. The transport canal stretches from the branch point, suitably along walls and/or the ceiling, with required mounting brackets 15, to a demolition device 14 and/or a collecting device 16. The transport canal 12 may, in so requiring places, comprise bends 17 with adequate radius for allowing unhindered passage of the cans. The transport canal is suitably equipped with connections for pressurised air, in intervals, e.g. every tenth meter, which gives the opportunity to empty the system of cans, whereby these are blown backwards in the transport canal in direction towards the feeding-in device.

Figure 2:
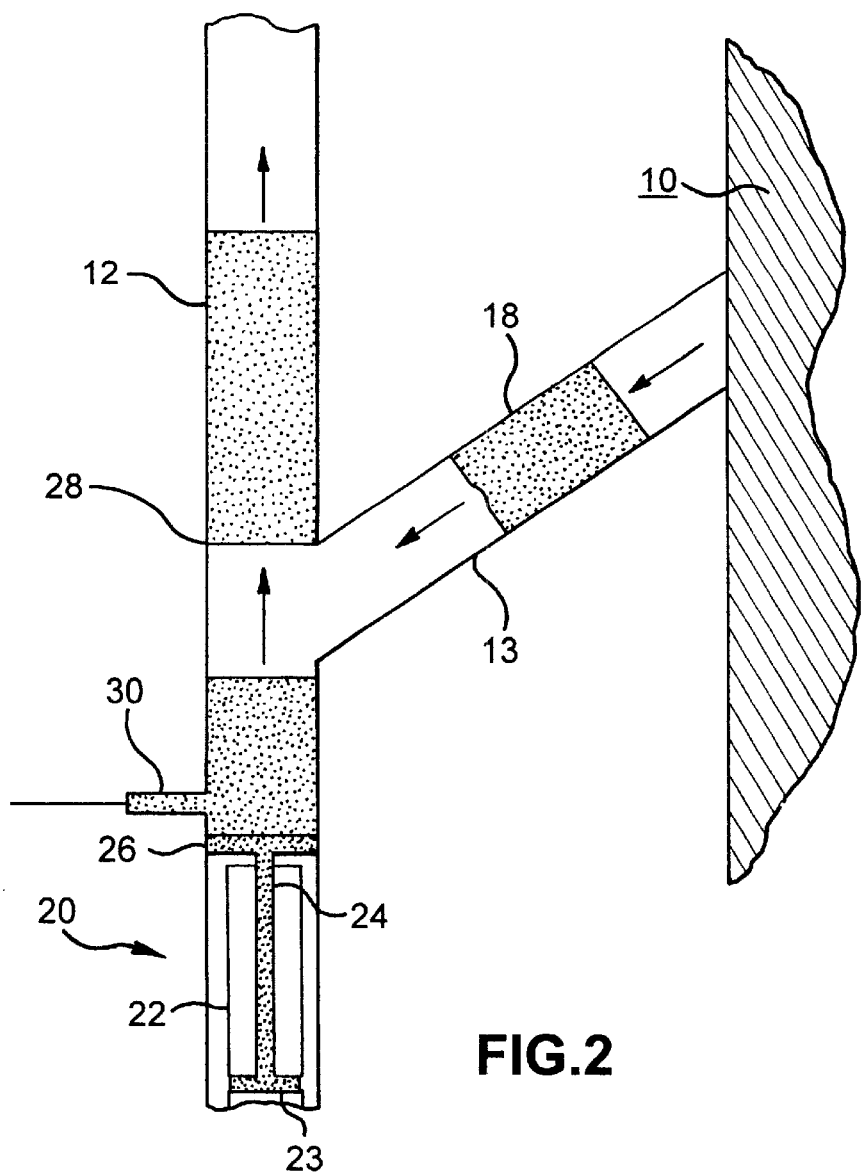
FIG. 2 shows a driving device and a part of a transport canal to be used in the collecting according to the invention.
Figure 3:
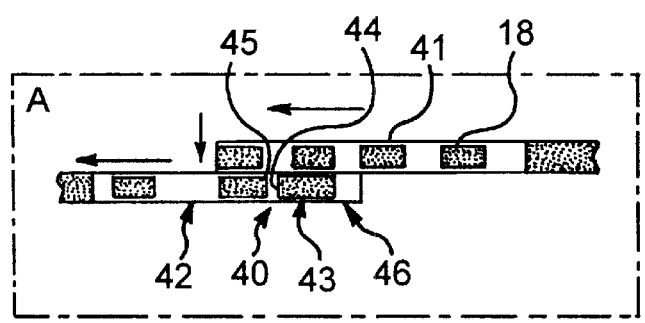
FIG. 3 shows a magnification of part A in FIG. 1, which part includes a device for pressure enhancement.

A driving device 20 is connected to the transport canal 12, suitably in the first part of the transport canal, closest to the feeding-in device 10. The driving device 20 and a part of the transport canal 12 and the branch canal 13 are shown in a larger scale in FIG. 2. The driving device is arranged upstream of the branch point for the branch canal 13 and comprises a preferably pneumatic cylinder 22 with a piston 23 and a piston arm 24, on the end of which a plate 26 is arranged. The driving device is suitably arranged at least partly inside the transport canal 12 which in this location has a mainly vertical length direction, whereas the plate 26 of the driving device faces upwards in the transport canal and acts in that direction when the driving device is activated. At least a part of the driving device is suitably encapsulated inside a stainless steel tube which has been joined to the end of the transport canal 12. A nonreturn valve unit 28 is arranged a distance downstream the cylinder 22, at a location just downstream, i.e. above, the branch point for the branch canal 13. A transmitter 30 is arranged in the wall of the transport canal 12, in the vicinity of the plate 26 of the pneumatic cylinder, when the plate is in its lower end location and the cylinder is withdrawn.

Figure 4:
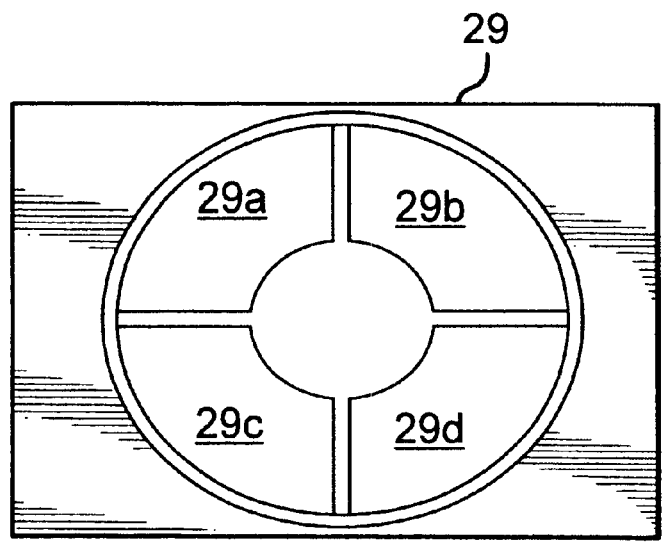
FIG. 4 shows a nonreturn valve unit for the transporting device.

In FIG. 4, there is shown a conceivable type of gate 29 to be used in a nonreturn valve unit 28. This gate 29 consists of an exchangeable plate which is shoved into a holder (not shown) which is mounted in the transport canal 12. The gate has an opening and a number of, e.g. four, spring fingers 29a, 29b, 29c, 29d. These fingers, and suitably also the rest of the gate 29, are made of a flexible material, preferably polyeten plastic, and are adequately resilient to allow passage of the cans when they are pushed through by the driving device, but not resilient enough to let cans back downwards.

Figure 5:
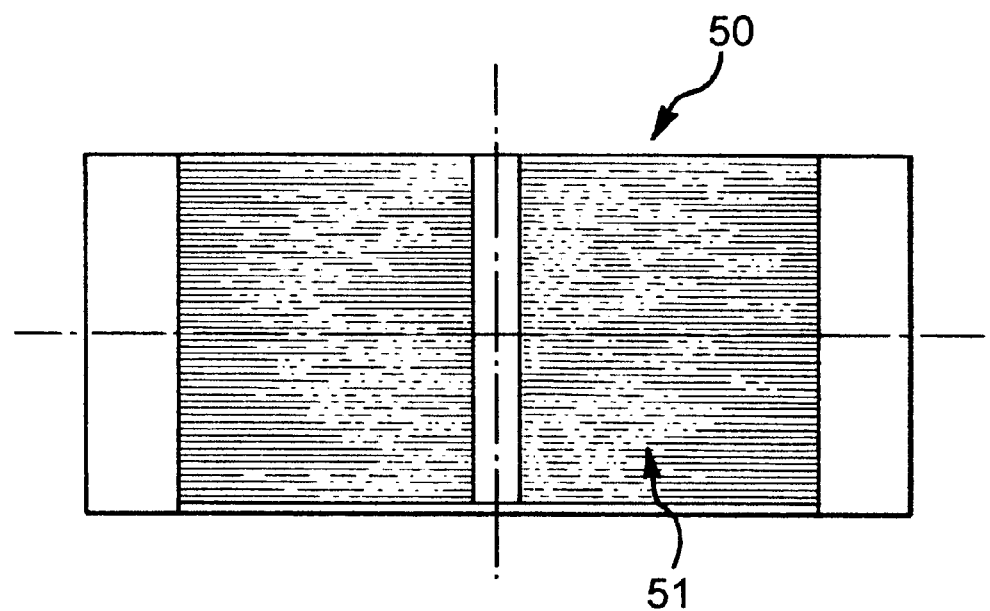
FIG. 5 shows an alternative embodiment of a nonreturn valve unit for the transporting device.

In FIG. 5, there is shown an alternative embodiment of a gate 50 to be used in a nonreturn valve unit 28. The gate 50 is shown from above, the intersection between the two centre lines corresponding to the position of the centre line of the transport canal. The gate 50 consists of an exchangeable cassette which is shoved into a holder (not shown) which is mounted in the transport canal 12. The cassette has a rectangular cross section, with sides that are longer than the diameter, or the largest width, of the transport canal 12. Preferably is measures about (100–200)×(80–140) mm. The nonreturn action is achieved by bristle 51 in a layer which is about 5–60 mm, preferably about 10–40 mm, and even more preferred about 10–30 mm thick. The bristle 51 is attached to the two opposing short sides of the gate 50 and in the middle there is an opening in the bristle with a width of about 5–40 mm, preferably about 5–20 mm. The construction is thereby adequately resilient to allow passage of the cans when they are pushed through by the driving device, but not resilient enough to let cans back downwards.

One or more pressure enhancement devices 40 may, if required, be arranged in the transport canal 12, suitably in a horizontal part of it, if the transport canal 12 is long, e.g. over 50 meters. At the pressure enhancement device 40, the transport canal 12 is cut off and the two ends have been displaced so that the canal 41 for incoming cans to the pressure enhancement device 40 lies above the canal 42 for outgoing cans a certain length, whereby the side walls of the canals in this length show apertures which allow the cans to fall by gravity from the canal 41 for incoming cans, down into the canal 42 for outgoing cans. A pneumatic driving device with a cylinder 43 with a piston (not shown) and a piston stem 44, on the end of which a plate 45 is arranged, is arranged in the beginning of the canal 42 for outgoing cans, i.e. the lower one of the two canal pieces. This pneumatic driving device is suitably encapsulated in a stainless steel tube 46 which has been joined to the end of the canal 42 for outgoing cans from the pressure enhancement device.

The transport canal 12 ends, as previously mentioned, in a demolition device 14 and/or a collecting device 16. The demolition device 14 may consist of a press which presses the cans together in order to reduce their volume, or a cutting device which cuts the cans into small pieces which also leads to decrease in volume. Preferably, there is arranged a nonreturn valve unit 28 (not shown) of the type shown in FIG. 4 or 5, in connection with the inlet of the demolition device 14, to ensure that only one can at a time enters the demolition device 14. The collecting device 16 consists of e.g. a container which is adapted to be emptied automatically by a trunk. A photo-cell (not shown) may be arranged in the collecting device, to register when it is full, in connection with which a conceivable grid (not shown) in the demolition device 14 may be opened for temporary bypass of new incoming cans into a sac.

The collecting system operates according to the following. The feeding-in device 10 reads the bar code on the cans 18 in a conventional manner, when they are fed in into the opening 11 by a customer, and produces a receipt to the customer after the feeding in has been completed. The fed in cans fall by gravity down into the branch conduit 13 on the backside of the feeding-in device, and land on the plate 26 of the driving device 20. The transmitter 30 senses that a can has been fed in, whereby the driving device is activated and the plate 26 is pneumatically pushed upwards, so that the can passes the nonreturn valve unit 28 in the transport canal 12. At the same time, the blocking device in the branch conduit 13 is activated to prevent the next can from getting behind the plate 26 when the plate moves upwards. The plate thereafter returns to its start position and is ready to take care of a new can which falls down towards the plate when the blocking device is retracted. This new can is also pushed upwards by the driving device 20 to pass the nonreturn valve unit 28, whereby the new can pushes the previous can yet a distance ahead in he transport canal 12, namely a distance which equals its length of the new can. The cans will, when the collecting system operates continuously in this way, with pauses between different feeding in periods, push each other in the transport canal 12 all the way to its end, or at least to a point where they fall down by gravity. Accordingly, the cans will abut each other in their short ends all the way, where the transport canal is running horizontally or with a slope upwards. This is not clear from FIG. 1, where the cans have been drawn as being separated from each other in order to appear distinctly. It is however clear from FIG. 2 what it will look like when four cans which have been fed in are being taken care of by the collecting system. All arrows without numbers in the figures indicate the moving direction of the cans.

A possible stoppage in the system is detected by the transmitter 30 together with a transmitter (not shown) in connection with the demolition device 14. If there is no signal from both transmitters, an alarm is activated and the hatch in the branch conduit 13 is opened so that newly fed in cans fall down into e.g. a sac which has been placed beneath the hatch. Thereby, the customer will not notice the stoppage. The stoppage is e.g. dealt with by blowing the system with pressurised air.

Figure 6A:
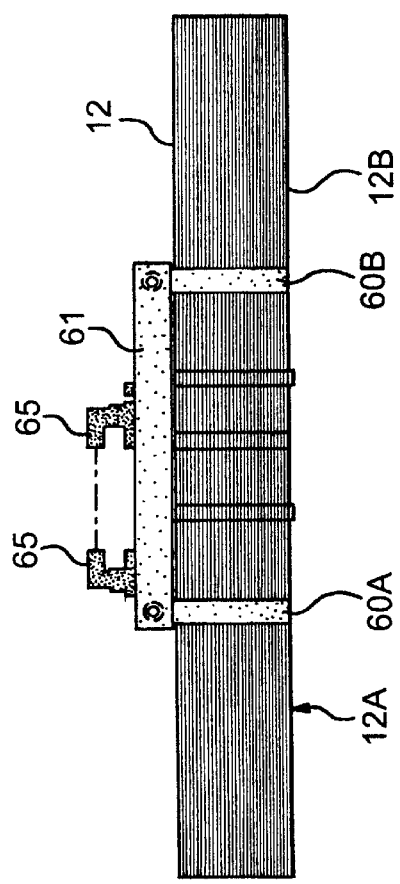
FIGS. 6A and 6B shows an arrangement for locking, mounting and de-mounting of pipe joints in the transport canal.
Figure 6B:
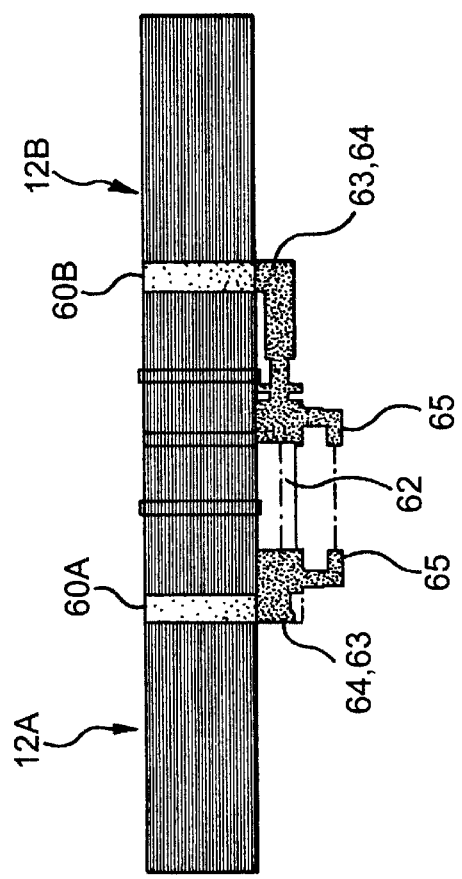

A possible stoppage can also be dealt with by de-mounting pipe joints and blowing with pressurised air locally or by rinsing a part of the tube/pipe/canal 12 in some other way, after having de-mounted one or several pipe joints. In FIGS. 6A and 6B there is shown a combined arrangement for the locking, mounting and de-mounting of pipe joints. FIGS. 6A and 6B are showing one such arrangement from two opposing sides of the pipe 12. Two pipe ends 12a and 12B, are preferably sealingly joined together with a standard type of joint. The joint is of a type that is smooth on the inside, to prevent cans from getting stuck on protruding parts. During operation of the collecting system, the two pipe ends 12A and 12B are locked to each other by a first tube clamp 60A at the first pipe end 12A and a second tube clamp 60B at the second pipe end 12B, which tube clamps are held together by a bar 61. The bar 61 is thereby attached in a first end thereof to the first tube clamp 60A and in a second end thereof to the second tube clamp 60B. The distance between the tube clamps 60A and 60B, respectively, is adapted to accommodate a standard pneumatic cylinder 62 there between and the tube clamps are provided with means 63 for attaching the existing, standard attachments 64 of the pneumatic cylinder to the tube clamps. The attachments for the bar 61 and attachment means 63 for the pneumatic cylinder 62 on the tube clamps may be arranged in essentially the same position on the tube clamps, but arranged so that the bar 61 and the cylinder 62 are moutable and de-mountable independently of each other.

When the pipe joint is to be de-mounted, the pneumatic cylinder 62 is attached by its existing, standard attachments 64 to the means 63 for attachment on the tube clamps 60A and 60B. Thereafter, the bar 61 is removed and the pneumatic cylinder 62 is activated to push the pipe ends 12A and 12B apart. The connections for the pressurised air on the cylinder 62 are shown as details 65. The attachment of the cylinder, the removal of the bar and the activation of the cylinder can be done very fast, in just a few seconds, which is beneficial when there is an acute need to deal with a stoppage.

When the pipe joint is to be mounted again, the pipe ends 12A and 12B are pulled together by activation of the cylinder 62. To ensure that the pipe ends 12A and 12B are centred in relation to each other, the tube clamps are preferably attached to the pipe ends by aid of a ruler or other centring means (not shown). After the pipe ends have been joined, the bar 61 is attached to the tube clamps 60A and 60B again, to lock the ends to each other, and the pneumatic cylinder 62 can be removed to be used at another pipe joint, if necessary.

The collecting system is not limited to the described embodiment, but may easily be varied within the scope of the following claims. Thus, the man skilled in the art will easily see that the branch conduit 13 not would be needed if the customer instead were to place the cans standing directly in the transport canal 12, which however could lead to risks of getting caught due to the action of the driving device. Another alternative can be that the branch conduit 13 is replaced with a conveyor belt on which the cans are placed to be transported into the transport canal. The skilled man will also realise that the nonreturn valve 28 can be eliminated if the first part of the driving device and the transport canal is horizontal or inclined downwards, in which case the branch conduit is connected to the top side of the transport canal, so that the cans fall into the same. It is also easy to realise that other types of driving devices and pressure enhancement devices than pneumatic devices can be used. The principle for the collecting system may be used also for other types of packagings than aluminium cans, e.g. so called PET bottles and other types of packagings which are not to be demolished, but are to be washed and used again. The principle for locking, mounting and de-mounting pipe joints may be used also for other piping arrangements.

What is claimed is:

1. Collecting system for PET bottles or cans (18), preferably for beverages, comprising a feeding-in device (10) for the bottles or cans, which feeding-in device is arranged at a first location, and an automatic transport device which is arranged to automatically transport the bottles or cans from said feeding-in device (10), in a transport canal (12), to at least one of a demolition and a collecting device (14, 16) which is arranged at a second location, said second location being situated at a predetermined distance from said first location, characterised in that the transport device comprises a driving device (20), which driving device is arranged to, one at a time, push the bottles or cans forward in said transport canal (12) by the driving device (20) pushing a first bottle or can (18) a distance ahead in the transport canal, whereby this first bottle or can pushes a second bottle or can, in front of the first one, ahead in the transport canal, which second bottle or can, in its turn, pushes a third bottle or can, in front of the second one, ahead in the canal.

2. Collecting system according to claim 1, characterised in that said second location is situated at least 5 m from said first location.

3. Collecting system according to claim 1, characterised in that said driving device comprises a pneumatic cylinder (22).

4. Collecting system according to claim 1, characterised in that the bottles or cans are lead from said feeding-in device (10) to said driving device (20), in a branch conduit (13) to the transport canal (12).

5. Collecting system according to claim 1, characterised in that said transport device comprises a transmitter (30) which senses a bottle or can (18) when it has been fed in into the collecting system, whereby the driving device (20) is activated.

6. Collecting system according to claim 1, characterised in that a nonreturn valve unit (28) is arranged in the transport canal (12), preferably in the vicinity of said driving device (20).

7. Collecting system according to claim 6, characterised in that said nonreturn valve unit (28) comprises resilient spring fingers 29a, 29b, 29c, 29d, adapted to prevent the bottles or cans from going upstream in the transport canal (12).

8. Collecting system according to claim 6, characterised in that said nonreturn valve unit (28) comprises bristle 51, adapted to prevent the bottles or cans from going upstream in the transport canal (12).

9. Collecting system according to claim 1, characterised in that a pressure enhancement device (40) for enhancing the transport effect, is arranged in the transport device, preferably in the transport canal (12), which pressure enhancement device preferably comprises a pneumatic cylinder (43).

10. Collecting system according to claim 1, characterised in that a joint in the transport canal 12 is arranged to be quickly mounted and/or demounted, the joint having means 63 for attaching attachments 64 of a pneumatic cylinder 62, so that the attachments 64 of the cylinder act upon the attachment means 63 on the joint to push apart or pull together the canal ends 12A and 12B, respectively, when the pneumatic cylinder is activated.

11. Collecting system according to claim 10, characterised in that said attachment means 63 on the joint are adapted to be attached to existing, standard attachments 64 on the pneumatic cylinder 62.

12. Collecting system according to claim 10, characterised in that said joint also comprises a bar 61, adapted to lock the canal ends 12A and 12B, respectively, to each other during operation of the collecting system.

13. Collecting system according to claim 1, characterised in that said feeding in device (10) is an existing automatic machine, the outlet of which is adapted to fit said transport device.

14. Collecting system according to claim 1, characterised in that said second location is situated at least 8–10 m from said first location.

15. Collecting system according to claim 1, characterised in that said second location is situated at least 10–80 m from said first location.

16. Collecting system for PET bottles or cans (18), preferably for beverages, comprising a feeding-in device (10) for the bottles or cans, which feeding-in device is arranged at a first location, and an automatic transport device which is arranged to automatically transport the bottles or cans from said feeding-in device (10), in a transport canal (12), to at least one of a demolition and a collection device (14, 16) which is arranged at a second location, said second location being situated at a predetermined distance from said first location, characterised in that the transport device comprises a driving device (20), which driving device is arranged to push the bottles or cans forward in said transport canal (12) by the driving device (20) pushing a first bottle or can (18) a distance ahead in the transport canal, whereby this first bottle or can pushes a second bottle or can, in front of the first one, ahead in the transport canal, which second bottle or can, in its turn, pushes a third bottle or can, in front of the second one, ahead in the canal, and characterised in that said transport device comprises a transmitter (30) which senses one bottle or can (18) at a time when it has been fed into the collecting system, whereby the driving device (20) is activated.

\* \* \* \* \*